Aug. 20, 1963　　　F. R. HASELTON　　　3,101,066
SUBMARINE HYDRODYNAMIC CONTROL SYSTEM
Filed July 14, 1961　　　　　　　　　　4 Sheets-Sheet 1

INVENTOR,
Frederick R. Haselton
BY
ATTORNEY

Aug. 20, 1963   F. R. HASELTON   3,101,066
SUBMARINE HYDRODYNAMIC CONTROL SYSTEM
Filed July 14, 1961   4 Sheets-Sheet 2
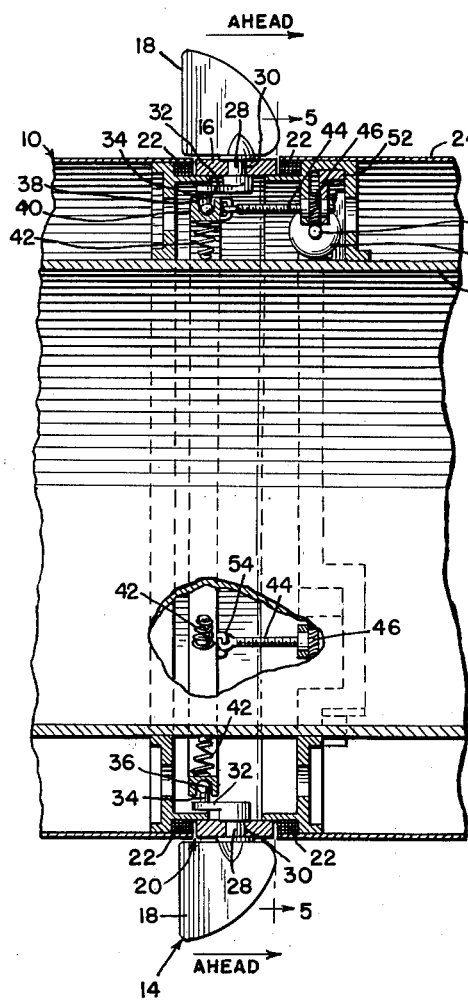
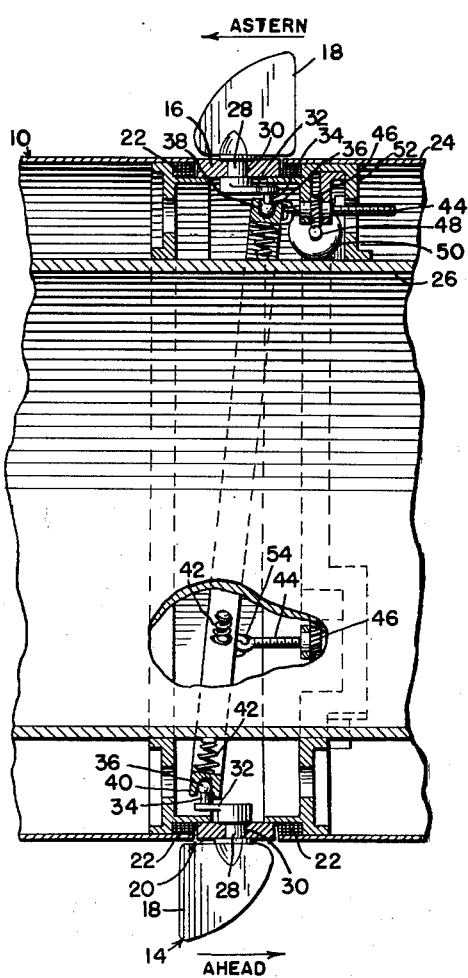
INVENTOR,
*Frederick R. Haselton*
BY
ATTORNEY

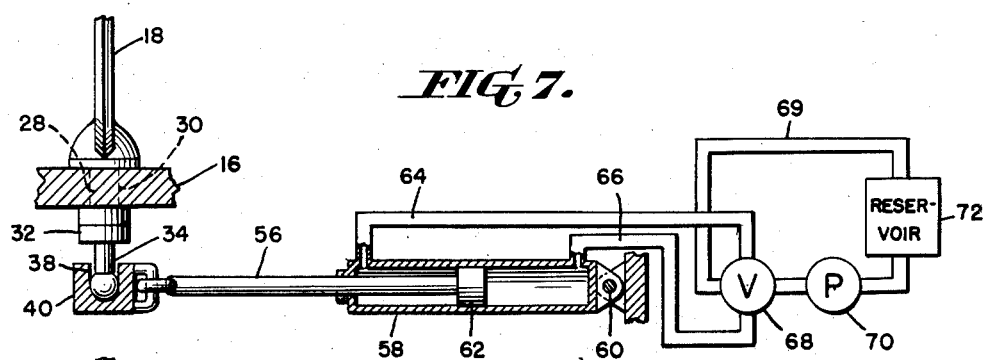
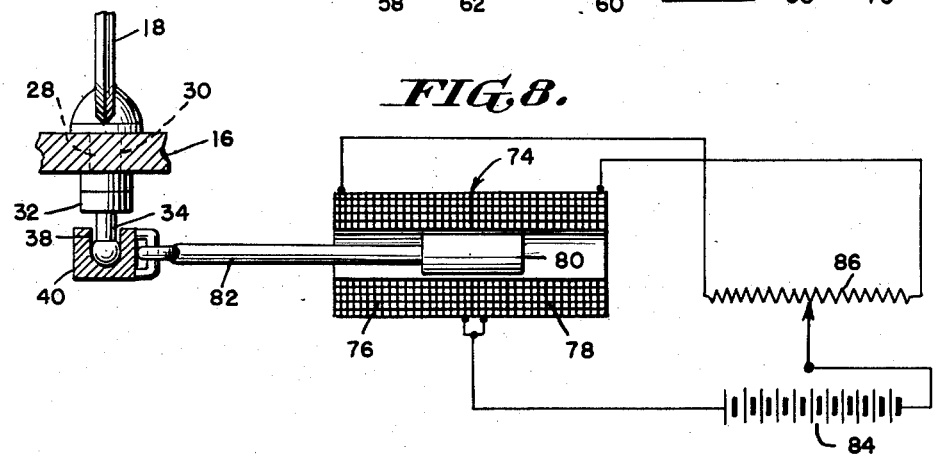
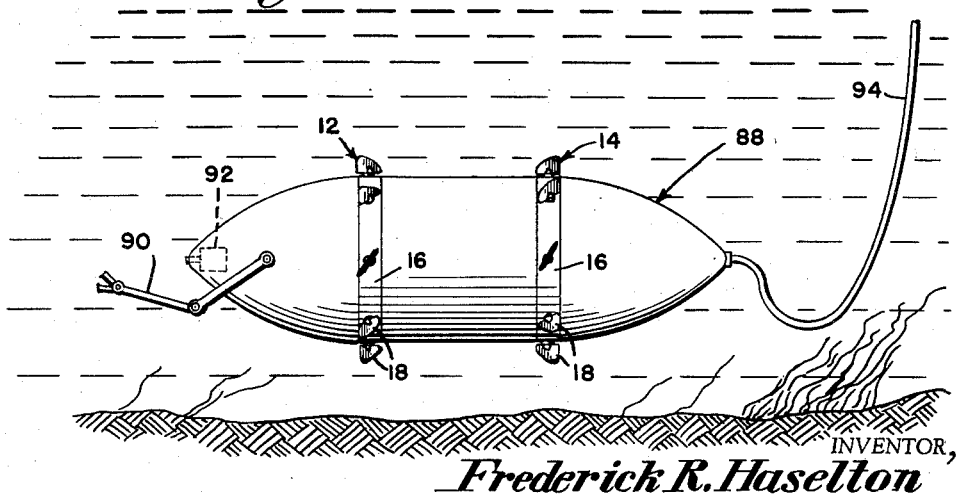

United States Patent Office 3,101,066
Patented Aug. 20, 1963

3,101,066
SUBMARINE HYDRODYNAMIC CONTROL
SYSTEM
Frederick R. Haselton, 9110 Ewing Drive, Bethesda, Md.
Filed July 14, 1961, Ser. No. 124,236
6 Claims. (Cl. 114—16)
(Granted under Title 35, U.S. Code (1952), sec. 266)

The invention described herein may be manufactured and used by or for the Government of the United States of America for governmental purposes without the payment of any royalties thereon or therefor.

The present invention relates to propulsion and control of neutrally buoyant vehicles in a fluid medium. More particularly, the invention relates to the combining of the propulsion and control of neutrally buoyant submarine vessels or other vehicles capable of maneuvering in a fluid medium such as, water or air, by collective and cyclic varying of the pitch of the propelling blades.

In the propulsion of submarine vessels it is known in the prior art to employ counter-rotating propelling blades of fixed pitch rotating around the circumference of the hull as exemplified by the patents to H. M. Combs for Submarine Type Sea Train, Patent No. 2,727,485 and to G. Lucich for Propelling Mechanism for Torpedoes, Patent No. 2,094,997. Both of the foregoing patents depend on means other than the propeller blades for steering and control. A similar propelling mechanism having collective pitch adjustment for the blades is shown in the patent to S. Lake for Flying Machine, Patent No. 1,247,412.

In the present invention, the pitch of the fore and aft counter-rotating propelling blades is not only varied collectively to provide variable forward and reverse propulsive speeds at a constant speed of rotation, but superimposed on the collective pitch, the pitch of the blades is varied cyclically, that is, at selected positions during the rotation of the blades the pitch is varied to provide steering or motion perpendicular to the longitudinal axis of the vessel in addition to the forward or reverse propulsive motion. It is also possible to provide perpendicular motion without forward or reverse motion. Thus by proper manipulation of the blades the vehicle is caused to maneuver in all six degrees of freedom, that is, to rise to the surface, descent to a desired depth, move in forward and reverse directions, and move or turn to right or left, or any combination of the foregoing. In other words, the vehicle may be maneuvered in any direction with the axis thereof at any attitude. These motions are accomplished without conventional control surfaces such as rudders and diving planes.

The apparatus of the present invention is readily usable for the propulsion and control of any underwater vehicle, such as, submarines, underwater manipulators and other such vehicles where accurate universal maneuverability is desirable.

An object of the present invention is to provide high efficiency in propulsion and control of a vessel in a fluid medium and wherein the vessel is caused to be maneuvered in any direction without the use of conventional control surfaces.

Another object is to provide control of a submarine vessel having peripheral counter-rotating propellers without resorting to the use of diving planes and rudders.

A further object is to increase the maneuverability of a submarine. A still further object is to provide a combination drive and control for a submarine which avoids the use of packed shaft joints thus to increase the depth to which the submarine may descend.

Other objects and many of the attendant advantages of this invention will be readily appreciated as the same becomes better understood by reference to the following detailed descripiton when considered in connection with the accompanying drawings wherein:

FIG. 3 is a sectional view taken along line 3—3 of FIG. 2;

FIG. 4 is a sectional view similar to FIG. 3 and showing the pitch adjusting ring tilted, thus moving the blades or vanes passing the top of the vessel to the full astern position and the blades or vanes passing the bottom of the vessel to full ahead position;

FIG. 7 is a diagrammatic view showing a modification of the pitch adjusting structure wherein hydraulic pressure is employed;

FIG. 8 is a diagrammatic view showing a further modification of the pitch adjusting structure wherein solenoids are employed; and FIG. 9 is a view showing the propulsion and control structure of the present invention used with an underwater manipulator device.

Figure 1:
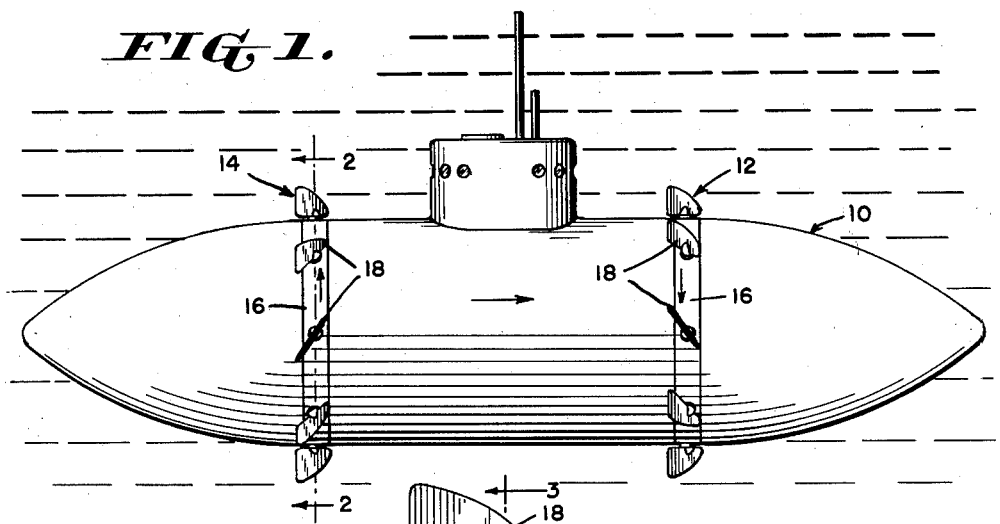
FIG. 1 is a side elevation of a submarine vessel showing the present invention incorporated therein.

Referring more particularly to the drawings wherein like numerals indicate like parts throughout the several views, 10 indicates generally a neutrally buoyant submarine vessel of circular cross-section and having fore and aft counter-rotating propelling and control assemblies 12 and 14, respectively. Neutral buoyancy of the submarine is maintained in any conventional manner such, as by varying the amount of water in ballast tanks. As will be seen from an inspection of FIG. 1 no other control or steering devices are employed in the device of the present invention. Each of the assemblies 12 and 14 comprises a ring 16 having a diameter substantially equal to the cross-sectional diameter of the vessel 10. Pivotally mounted in the rings 16 are blades or vanes 18, the axis of the blades preferably being perpendicular to and radiating from the longitudinal axis of the vessel 10.

The rings 16 also are employed as rotors or armatures for a pair of electric motors 20 (FIGS. 3 and 4) capable of operating in the presence of water, and each including field coils 22 adapted to be energized from any suitable source of A.C. power. The field coils 22 of the motor 20 are fixed in an outer hull 24 of the vessel 10 and extend completely around the hull. It is thus apparent that both the rotor and field coils of the motor 20 are exposed to the water and are outside of a pressure hull 26. This construction avoids the use of packed propeller shaft journals as is the case where the prime mover is mounted within the hull and the propeller is positioned outside the hull. Such journals, because of the possibility of leakage, are undesirable in submarine construction and have heretofore been unavoidable.

Each of the blades 18 is spacedly mounted on a ring 16 for pivotal motion by a pivot shaft 28 fixed to each of the blades whereby the pitch thereof can be varied. Each shaft 28 is mounted in a bearing bore 30 in its carrying ring 16.

Mounted on the inner end of each of the shafts 28 is a crank arm 32 having a pin 34 depending therefrom and which has a rounded head 36 riding in a groove 38 formed in a pitch adjusting ring 40.

The ring 40 is resiliently held in position by a plurality of coil springs 42 fastened to the inner surface of the ring. The springs 42 engage the pressure hull 26 and are slidable on the hull as the ring 40 is moved to adjust the pitch of the blades 18.

In order to adjust blades 18, the rings 40 are moved, in accordance with one embodiment of the invention, by means of a number of lead screws 44 each of which is axially threaded into a worm wheel 46. Each of the worm wheels 46 is meshed with a worm 48 on the shafts of a pitch adjusting motor 50. The foregoing apparatus is suitably supported by brackets and supports as at 52. It is to be understood that the motors 50 are operated in unison when the blades are adjusted for fore and aft speed only and are operated independently or for different lengths of time to provide tilted positions of the ring 40 when cyclic operation is desired.

Conveniently, the pitch adjusting motors and associated mechanism for moving the lead screws may be positioned 120 degrees apart, the ends of the lead screws 44 being fastened as at 54 to the fore and aft pitch adjusting rings 40, to provide for slight misalignment while ring 40 is tilted for cyclic change of pitch, as shown in FIG. 4.

If desired, variations of the pitch of blades 18 may be accomplished hydraulically. In this case, as shown in FIG. 7, each of the lead screws 44 attached to pitch adjusting ring 40 is replaced by a piston rod 56 of a double-acting hydraulic cylinder 58, one end of which is anchored as at 60. A piston 62 is mounted on rod 56 and is positioned within cylinder 58. Fluid conduits 64 and 66 are connected at opposite ends of cylinder 58 for admitting fluid under pressure to either end of the cylinder, thus to move piston 62, rod 56, and the pitch adjusting ring 40 in either direction. While it is desired to employ at least three hydraulic cylinders for controlling the position of ring 40, only one has been shown in the drawings.

Fluid conduits 64 and 66 are connected to a selector valve 68 which communicates with a pump 70 for supplying fluid under pressure from a reservoir 72 to either of the conduits 64, 66. Thus the ring 40 is moved in either direction in accordance with the position of selector valve 68. Valve 68 also has means for returning fluid to the reservoir through conduit 69 from the side of the piston not being supplied with fluid under pressure. It is seen from the foregoing that the ring 40 may be moved hydraulically into the same positions and the pitch of the blades 18 changed both cyclically and collectively in the same manner as with the electric motor pitch changing structure previously described.

It is also within the province of the present invention to control the pitch of the blades magnetically through the use of electromagnets or as shown specifically in FIG. 8 by a plurality of spaced solenoid assemblies, one of which is shown generally at 74. Each of the solenoid assemblies 74 comprises a pair of axially aligned coils 76, 78. Slidable within the opposing coils 76, 78 is an armature 80 formed on the end of a rod 82 similar to rod 56 and lead screw 44 and fastened to the ring 40 in the same manner. The coils 76, 78 are energized by a source of electric power, such as a battery 84. The current to each pair of coils 76, 78 is controlled by means of a variable resistor 86. In this manner, by adjusting the amount of current applied to each of the coils 76, 78 of each solenoid assemby 74, the position of the respective armatures with respect to the associated coils is varied to move the ring 40 either back and forth evenly to provide for straight ahead or astern motion of the submarine or to provide steering motion by tilting ring 40 in the proper direction to urge the submarine travel in an arcuate path to port or starboard. By proper adjustment of the respective solenoids 74 the submarine can also be caused to rise or submerge in the same manner as is accomplished with the pitch changing electric motors or the hydraulic cylinders previously described.

In operation, it is clear that the forward and reverse propulsion is accomplished by changing the angle of attack of blades 18 collectively from a zero position where the blades have no propulsive force, to an angle to one side or the other for forward and reverse propulsion. It is, of course, clear that forward and reverse speed can be increased or reduced by either changing the angle of the blades to a more or less efficient propulsive angle or by increasing or reducing the speed of the propulsion motors 20.

The steering effect and motion perpendicular to the longitudinal axis of the vessel is accomplished in the following manner. Assuming that the vessel is travelling at half speed forward (the blades of each of the propelling assemblies 12 and 14 being set at an angle intermediate the angle for zero speed and the angle for full speed) and it is desired to make a turn to starboard while proceeding underway, the pitch adjusting ring 40 of each assembly 12 and 14 is maintained at the half speed position on the starboard side while it is adjusted in a directtion toward the full speed position on the port side, thus greater propelling force is applied to the port side of the vessel to turn the vessel to starboard. If it is desired to turn the vessel to port, greater propelling force is applied to the starboard side. To turn the vessel upward the rings 40 are adjusted to provide greater propelling force as the blades pass the bottom portion of their rotation around the vessel, while to turn the vessel downward rings 40 are moved to provide greater propelling force at the top portion of the blade rotation.

If it is desired to move laterally to the port side without turning and without fore or aft motion, the fore and aft assemblies are rotating in opposite directions and the fore assembly is set to provide greatest thrust adjacent the top of the vessel with no thrust at the bottom, the aft assembly is set to provide greatest thrust adjacent the bottom and no thrust at the top. The active blades (those at an angle sufficient to cause thrust) of the fore and aft assemblies are set to provide thrust along the longitudinal axis of the vessel in opposition to each other, thus no movement is caused fore and aft. The blades therefore only provide thrust to one side or the other depending upon the direction of rotation and whether the top or the bottom is selected as the active or thrust area. If the vessel has a tendency to rotate on an axis intermediate the fore and aft ends during the foregoing maneuver, the thrust area of each of the propelling assemblies may be shifted to one side or the other to correct this condition.

With the wide range of adjustment provided by the pitch adjusting mechanisms of the present invention it is possible to maneuver the vessel in all directions and the foregoing examples are given to provide an understanding of a few of the many different maneuvers in six degrees of freedom which the structure of the present invention is capable of performing.

Figure 2:
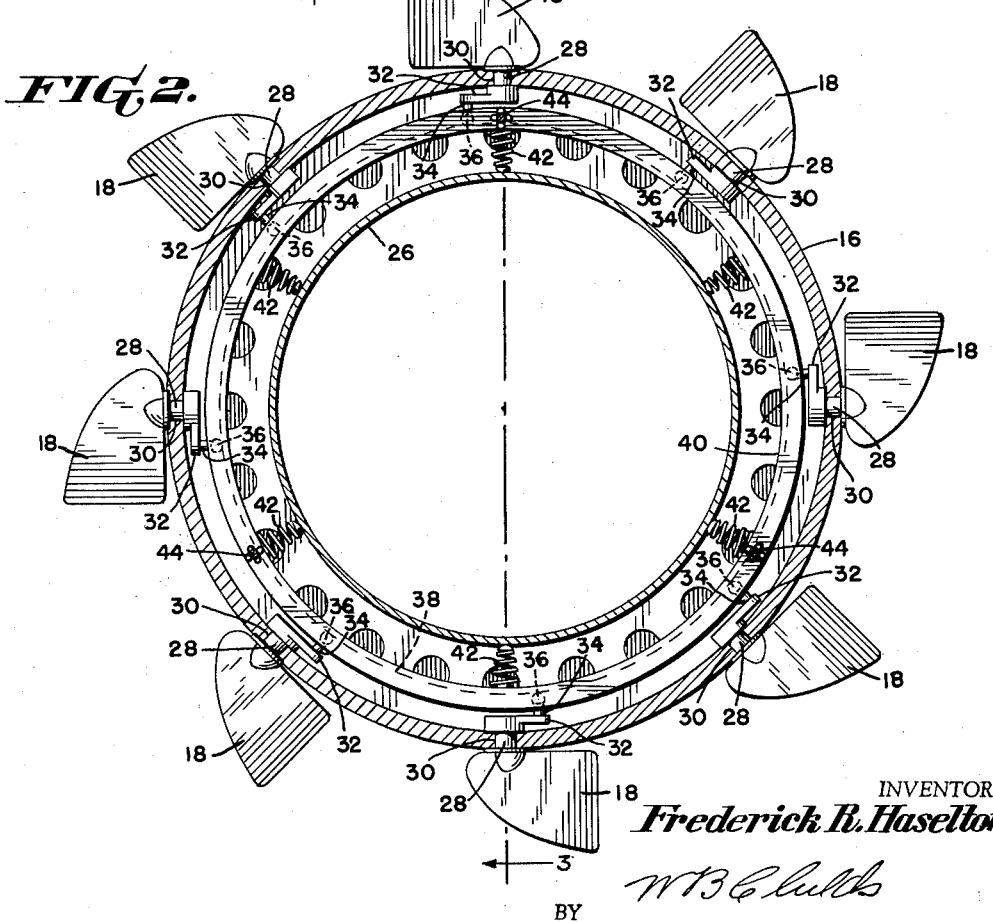
FIG. 2 shows a sectional view taken along the line 2—2 of FIG. 1 and showing all blades or vanes in the full ahead position.
Figure 5:
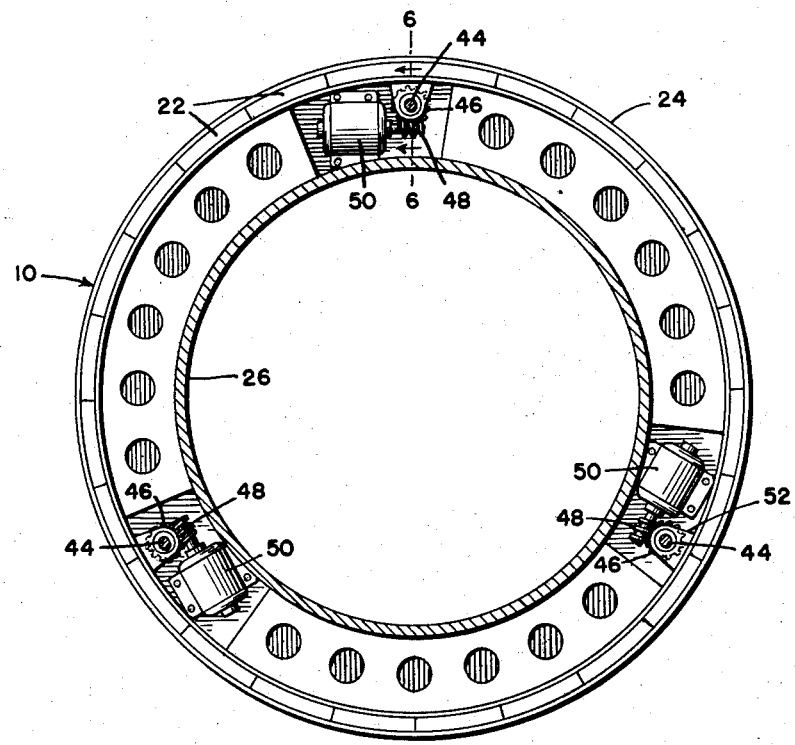
FIG. 5 is a sectional view taken along line 5—5 of FIG. 3.
Figure 6:
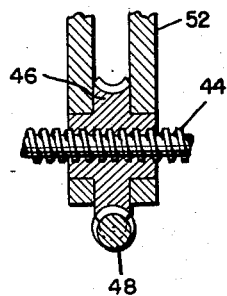
FIG. 6 is a sectional view taken along line 6—6 of FIG. 5.

A desirable feature of the present invention is the direct acting propulsion motor structure indicated generally at 20 wherein no rotating shafts or other moving members thereof penetrate the pressure hull 26, thus no leaks into the hull are possible because of worn shaft seals. It is clear from an inspection of FIGS. 2, 3 and 4 that all of the driving and control structure is mounted outside of the pressure hull 26 and within the outer hull 24, thus the only portions projecting beyond the outer hull are the variable pitch blades 18 which structure provides efficient streamlining of the vessel.

The propelling and control structure of the present invention is readily usable for any underwater vehicle such, for example, as the neutrally buoyant underwater manipulator vessel of FIG. 9 and shown generally at 88. This vessel is provided with fore and aft propulsion and control assemblies 12 and 14 having the same structure as those employed with the vessel 10. Manipulator arms 90 of any well-known construction are mounted on one end of vessel 88. A television camera 92 is mounted in the vessel 88 at the same end for transmitting an image of the operation of manipulator arms 90 to a closed circuit television receiver (not shown). The vessel is electrically connected to a surface vessel (not shown) in the usual manner by a multiconductor cable 94 for controlling, from the surface ship, the operation of the assemblies 12 and 14 and the manipulator arms 90.

Obviously many modifications and variations of the present invention are possible in the light of the above teachings. It is therefore to be understood that within the scope of the appended claims the invention may be practiced otherwise than as specifically described.

What is claimed is:

1. A submarine vehicle for operation in a fluid medium comprising, a neutrally buoyant cylindrical body for said vehicle, a pair of spaced peripheral propulsion units mounted for rotation around said body, pitch adjustable blades radially and pivotally mounted on said propulsion units, and means operatively connected to said blades for collectively and cyclically adjusting the pitch of said blades for maneuvering said vehicle in six degrees of freedom.

2. Submarine propulsion and control apparatus comprising, a neutrally buoyant submarine vehicle, a water-tight body for said vehicle having at least fore and aft cylindrical portions, a first ring mounted exteriorly of said fore body portion for rotation about the axis of said body portion, a second ring mounted exteriorly of said aft portion for rotation about the axis of said aft portion, said first and second rings being adapted to rotate in opposite directions, a plurality of variable pitch blades pivotally mounted on each of said rings for rotation therewith, and means for changing the pitch of said blades both collectively and cyclically to provide forward and reverse thrust for said vehicle as well as manuverability in the up, down, port and starboard directions.

3. Submarine propulsion and control apparatus comprising, a neutrally buoyant submarine vehicle having a water-tight cylindrical body, a pair of propulsion and control assemblies mounted in spaced relationship exteriorly of said cylindrical body, means for rotating said assemblies about the axis of said body, each of said assemblies including a plurality of blades pivotally mounted for pitch adjustment, means carried by said vehicle for adjusting the pitch of said blades collectively for varying the speed and fore and aft directions of travel of said vehicle, and means carried by said vehicle for adjusting the pitch of said blades cyclically for steering said vehicles and moving said vehicle in directions perpendicular to the longitudinal axis of said vehicle.

4. Propulsion apparatus for a submarine having a cylindrical shape, a water-tight inner hull for said submarine, a pair of electric propulsion motors each having the shape of a ring and comprising a ring-like armature for rotation around said submarine and a ring-like stator including field coils secured exteriorly of said hull, an outer shell spaced from said inner hull and covering the stators of said motors, said outer shell being provided with circumferential slots permitting said armatures to rotate therein, a plurality of spaced radially extending propulsion blades pivotally mounted on and around said armatures, and means for changing the pitch of said blades collectively and cyclically whereby the submarine is moved in six degrees of freedom.

5. Submarine propulsion and control apparatus comprising, a neutrally buoyant vehicle operating in a liquid medium, a cylindrical body for said vehicle having an inner pressure hull and an outer shell spaced therefrom, said outer shell being provided with a pair of spaced circumferentially extending slots, a propulsion and control motor assembly mounted at opposite ends of said body for rotation around the exterior of said pressure hull, each of said assemblies comprising an armature ring rotatably mounted in each of said slots, field coils mounted on said shell adjacent said ring, a plurality of spaced propulsion blades pivotally carried on said ring, and means operatively connected to said blades for cyclically and collectively adjusting the pitch of said blades thereby providing thrust for forward and reverse motion of said vehicle and for maneuvering said vehicle.

6. Submarine propulsion and control apparatus comprising, a water-tight hull of cylindrical cross-section for said submarine, a first ring-shaped electric motor capable of operating in water and secured exteriorly of said hull at the forward end, a second ring-shaped electric motor capable of operating in water and secured exteriorly of said hull at the aft end, each of said ring-shaped motors having a rotor extending completely around the hull, a plurality of propulsion blades radially extending from each of said rotors and capable of pivotal movement whereby the pitch angle thereof is adjusted selectively to provide forward to reverse motion to said hull, means mounted exteriorly of said hull and associated with each of said blades for collectively and cyclically adjusting the pitch of said blades.

UNITED STATES PATENTS

References Cited in the file of this patent

| | | |
|---|---|---|
| 478,814 | Paine | July 12, 1892 |
| 1,675,914 | Silver | July 3, 1928 |
| 1,946,614 | Darr | Feb. 13, 1934 |
| 2,397,183 | Kilgore | Mar. 26, 1946 |
| 2,521,684 | Bates | Sept. 12, 1950 |
| 2,727,485 | Combs | Dec. 20, 1955 |
| 2,806,441 | Hoke | Sept. 17, 1957 |
| 2,974,627 | Whipple | Mar. 14, 1961 |